United States Patent [19]
Nakanishi

[11] Patent Number: 6,114,837
[45] Date of Patent: Sep. 5, 2000

[54] MULTIFUNCTIONAL APPARATUS AND CONTROL METHOD FOR SAID APPARATUS

[75] Inventor: Hideki Nakanishi, Tokyo, Japan

[73] Assignee: Canon Kabushiki Kaisha, Tokyo, Japan

[21] Appl. No.: 08/887,424

[22] Filed: Jul. 2, 1997

[30] Foreign Application Priority Data

Jul. 16, 1996 [JP] Japan ..................... 8-186213

[51] Int. Cl.⁷ .............. H02J 7/00; B41J 29/38; G03G 15/00
[52] U.S. Cl. .................... 320/136; 347/5; 399/9
[58] Field of Search ............ 347/3, 5; 358/296; 320/132, 135, 136; 399/9, 75

[56] References Cited

U.S. PATENT DOCUMENTS 5,729,061  3/1998  Narita ........................ 307/130

FOREIGN PATENT DOCUMENTS

0 641 114 A1  3/1995  European Pat. Off. ....... H04N 1/024
58-116076  6/1984  Japan ..................... H04N 1/042

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

An invented battery-operating multifunctional apparatus in use for such as office automation provides an adequate threshold level thereby to detect a low energy state of the battery by discriminating whether species of a head loaded on a carriage unit 7 is an ink head 401 for printing the characters or a scanner head 402 for reading the image pictures. To attain the purpose, the threshold value of the low battery state is lowered for the scanning operation compared with for the printing operation.

14 Claims, 5 Drawing Sheets

MULTIFUNCTIONAL APPARATUS AND CONTROL METHOD FOR SAID APPARATUS

BACKGROUND OF THE INVENTION

1. Field of the Invention

The present invention relates to a multifunctional apparatus, which can operate being driven by a battery, and to a control method for the apparatus; and, more particularly, to a multifunctional apparatus capable of both a printing (or inking) function of characters and a scanning function for reading image pictures.

2. Brief Description of the Related Art

In accordance with trends toward attaining portability and toward saving energy consumption seen in such sorts of apparatus as in use for office automation (referred to as "OA" hereinafter), various apparatus such as printers, personal computers and so on have recently been enabled to operate being driven by a battery. It is usual for the battery-operating apparatus to detect a state, wherein an energy quantity stored in the battery is low (referred to as "a low battery level" hereinafter), to protect components constituting the apparatus.

For instance, when a lowering of the energy quantity stored in a built-in battery of an inkjet-type printing equipment (printer) takes place suddenly during use and stops the printing operation, a printing head is exposed to an ambient atmosphere, which becomes a possible cause of printing failures such as poor printing. Accordingly, a means for detecting the low battery level of the inkjet-type printer is controlled so that a minimum electric power at least necessary for capping the printing head can be reserved in the battery.

On the other hand, there has recently appeared another trend among apparatus that only one constitution of apparatus can provide various functions. One of those examples is illustrated in FIG. 5.

Figure 5:
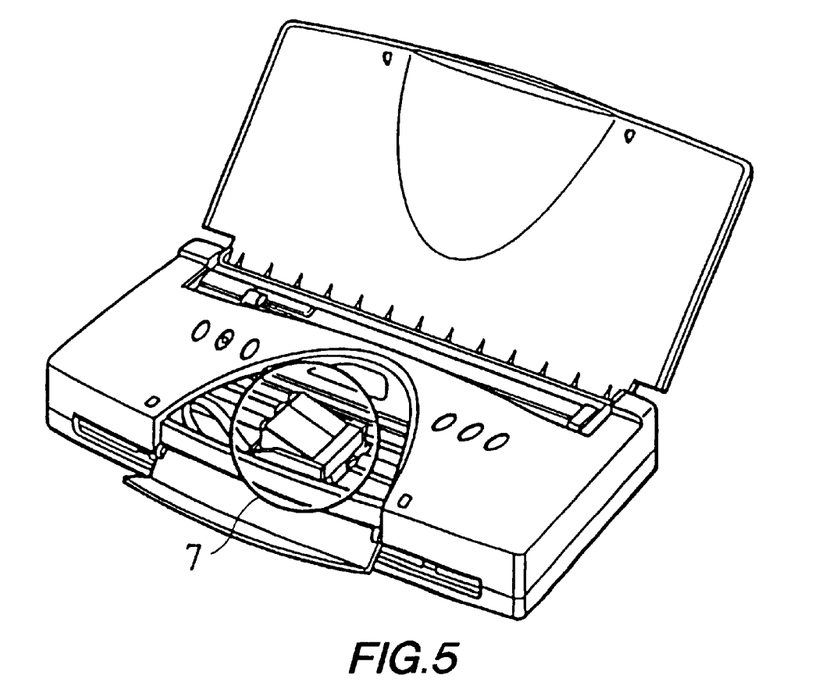
FIG. 5 is an illustration of a multifunctional apparatus in use for such as office automation.
Figure 5A:
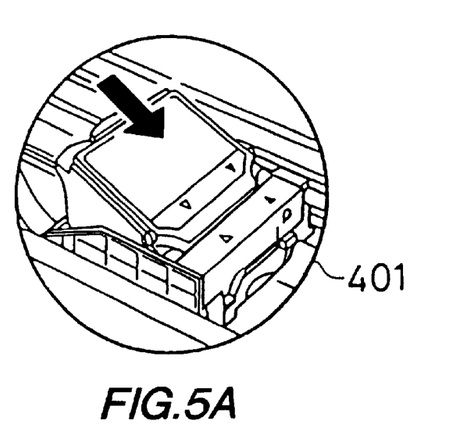
FIGS. 5A and 5B are enlarged views showing the apparatus with a printing head loaded and a scanning head loaded, respectively.
Figure 5B:
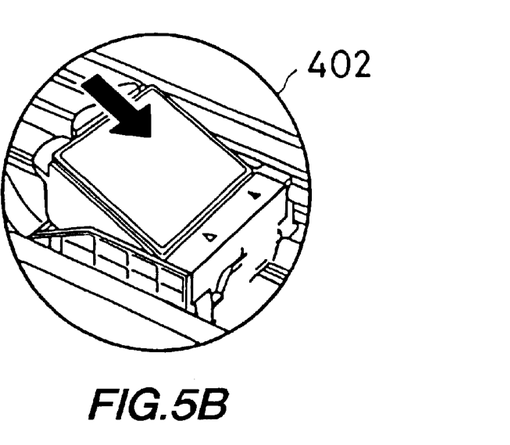

FIG. 5 is an overview of an apparatus capable of loading a plurality of different sorts of function units in a manner wherein exchangeability between units is reserved. Herein the apparatus shown in FIG. 5 represents an actual apparatus which exchangeably loads a printing head 401 (see FIG. 5A) in use for recording onto a recording medium and a scanner head 402 (see FIG. 5B) in use for reading an image of originals.

The apparatus shown in FIG. 5 varies its operating functions depending on the species of head loaded on a carriage unit 7, which is one of constituents of the apparatus. If the ink head 401 is, for instance, loaded on that unit, the apparatus is driven so that an inkjet-type printing (line printing) function operates. If the scanner head 402 in use for reading the image pictures is loaded on that unit on the contrary, the apparatus is driven so that a scanner function operates.

However, if the apparatus which has functions and constitutions mentioned above operates being driven by a battery, it encounters problems as follows:

If a detecting means of the low battery level is installed, for instance, being adjusted to the printing operation of above-mentioned apparatus in use for such as OA, the low battery level is set up so that a minimum electric power at least necessary for capping the printing head can be reserved. On the other hand, the scanner head 402 can operate at a lower storage level of the battery than the inkjet head 401 because the scanner head 402 does not require a battery reserve for capping. Namely, a set up of the low battery level being adjusted to the printing operation brings about an inefficient utilization of storage energy with regard to the scanner operation of the same apparatus.

On the contrary, when the low battery level is set up being adjusted to the scanner operation, the low battery level control whereby the scanner operates in down to the utilization limit of the battery capacity. However, if the printing function operates being driven by the battery on this lowest level, there arises a danger that the battery is excessively discharged to such a storage capacity level wherein capping of the printing head cannot be attained anymore. Namely, a set up of the low battery level being adjusted to the scanner operation can be regarded as the set up having a danger of causing the operational failures on the printing function involved by the same apparatus.

When those sorts of multifunctional apparatus are driven by the battery, there appears an important problem that a mismatching between the species of functions and the levels set up for detecting the low battery state takes place during the control of the detecting means.

SUMMARY OF THE INVENTION

An object of the present invention is to provide a means thereby to solve above-mentioned mismatching problem.

To attain above-mentioned object, the present invention provides an apparatus, which can operate being driven by a battery, comprising a detecting mean of a lowered state of an energy quantity stored in the battery and a plurality of operating functions; wherein a control method of the detecting means of the lowered state of the energy quantity stored in the battery during operating one function differs from another control method of the detecting means of the lowered state of the energy quantity stored in the battery during operating another function.

In carrying out the invention in one preferred mode, the present invention is also to provide a battery-operating multifunctional apparatus, comprising a detecting means of a lowered state of an energy quantity stored in the battery, a printing function and a scanner function; wherein control method of the detecting means of the lowered state of the energy quantity stored in the battery during operating the printing function differs from another control method of the detecting means of the lowered state of the energy quantity stored in the battery during operating the scanner function.

The constitutions mentioned above according to the present invention can solve the mismatching problem which has so far arisen between the species of the operating functions and the levels set up for detecting the low battery state.

DETAILED DESCRIPTION OF THE PREFERRED EMBODIMENTS

Hereinafter described in detail is the best mode contemplated by the inventor for carrying out the present invention into practice corresponding to the preferred embodiments.

The embodiments deal mainly with a multifunctional apparatus which can operate both a printing function and a scanner function.

Figure 1:
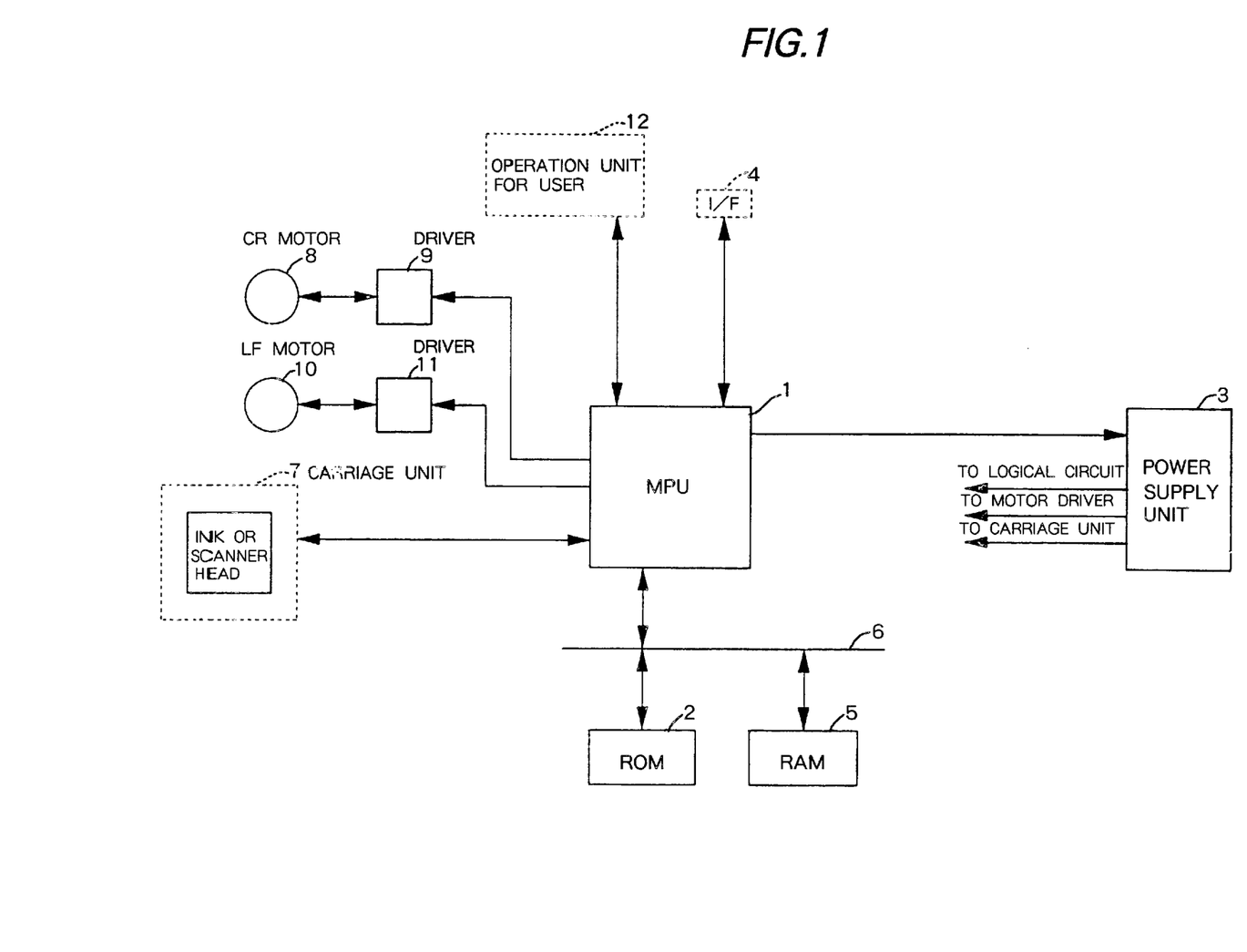
FIG. 1 is a block diagram of a multifunctional apparatus written in an embodiment according to the present invention.

First, constituents of the apparatus according to the embodiments are to be described. FIG.1 is a block diagram showing both the constituents and an organizational relation between those constituents, which constitute an operation system of the multifunctional apparatus of the embodiments.

Figure 2:
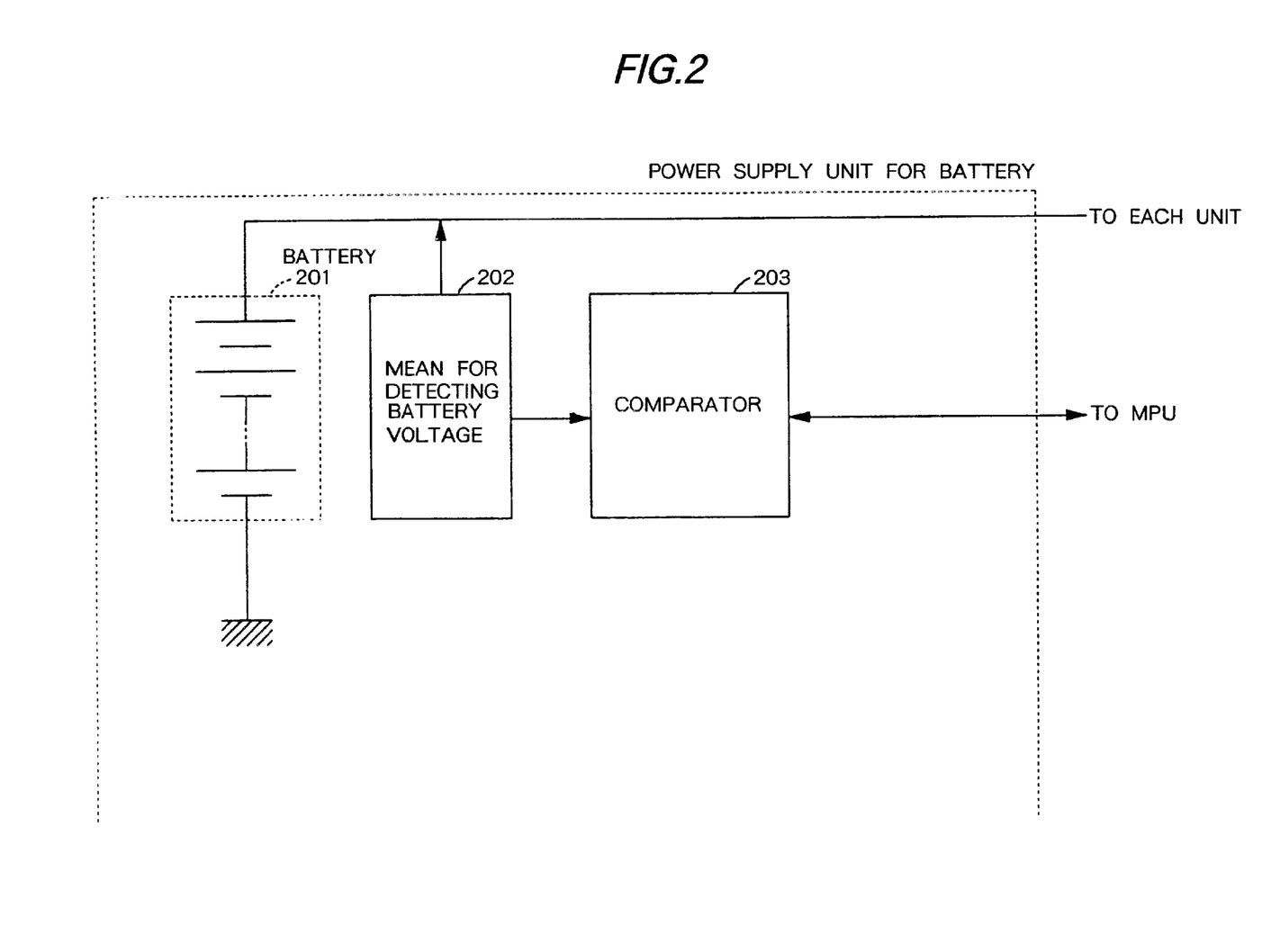
FIG. 2 is a detailed block diagram of an electric power supply unit.

The constituted operation system of this apparatus is governed and controlled by a microprocessor unit (referred to as "MPU" hereinafter) 1 and a read only memory (referred to as "ROM" hereinafter) 2, the latter of which is used for programming operation of the apparatus. This multifunctional apparatus of the embodiment includes a power supply unit 3. The unit 3 converts a power supply input from an alternating current (referred to as "AC" hereinafter) adapter or from the battery, without inverting into any intervening AC power, directly into new direct current (referred to as "DC" hereinafter) powers having required voltages to output the powers to each of other units. FIG.2 illustrates in detail the constituents which relate particularly to the present invention, i.e. constituents of the battery output.

Namely, the unit 3 has a space wherein a battery 201 for driving the multifunctional apparatus of the embodiment is built-in. A terminal voltage of the battery 201 is constituted so as to be monitored by a detecting mean 202 of a battery voltage. A value detected by the detecting mean 202 is to be sent to a comparator 203, which plays a role of comparing mean. The comparing mean 203 compares above-mentioned detected value with a certain threshold value sent from MPU 1 to pass a judgment whether a present status of the battery is on a low battery state or not.

Furthermore, communication of various sorts of data between the multifunctional apparatus concerned and a host computer is performed via an interface unit 4 shown in FIG. 1. The apparatus of the embodiment has a random access memory (referred to as "RAM" hereinafter) 5 and a data bus line 6 as controlling and managing means of the data.

On the other hand, the multifunctional apparatus of the embodiment is structurally equipped with a carriage unit 7, which can load either an ink head 401 or a scanner head 402 thereon, as can be seen from FIG. 5. The function operated by the multifunctional apparatus concerned is decided by the species of head which is loaded on the carriage 7. Namely, the apparatus concerned is designed so that the apparatus works as a printer if the ink head 401 is loaded on the carriage 7 while the apparatus works as a scanner if the scanner head 402 is loaded on the carriage 7.

The other constituents of the embodiments beside the cited above are summarized similarly in FIG. 1. They are a carriage (referred to as "CR" hereinafter) motor 8, a driver 9 of the same, a line feeding (referred to as "LF" hereinafter) motor 10 to feed the apparatus with media, namely, with white papers which are to be printed by the ink cartridge head 401, with manuscripts of which image pictures are to be read by the scanner head 402, with etc., a driver 11 of the same and an operation unit 12 for users, which is composed of switches, light emitting diodes (referred to as "LED" hereinafter) and so on.

Figure 3:
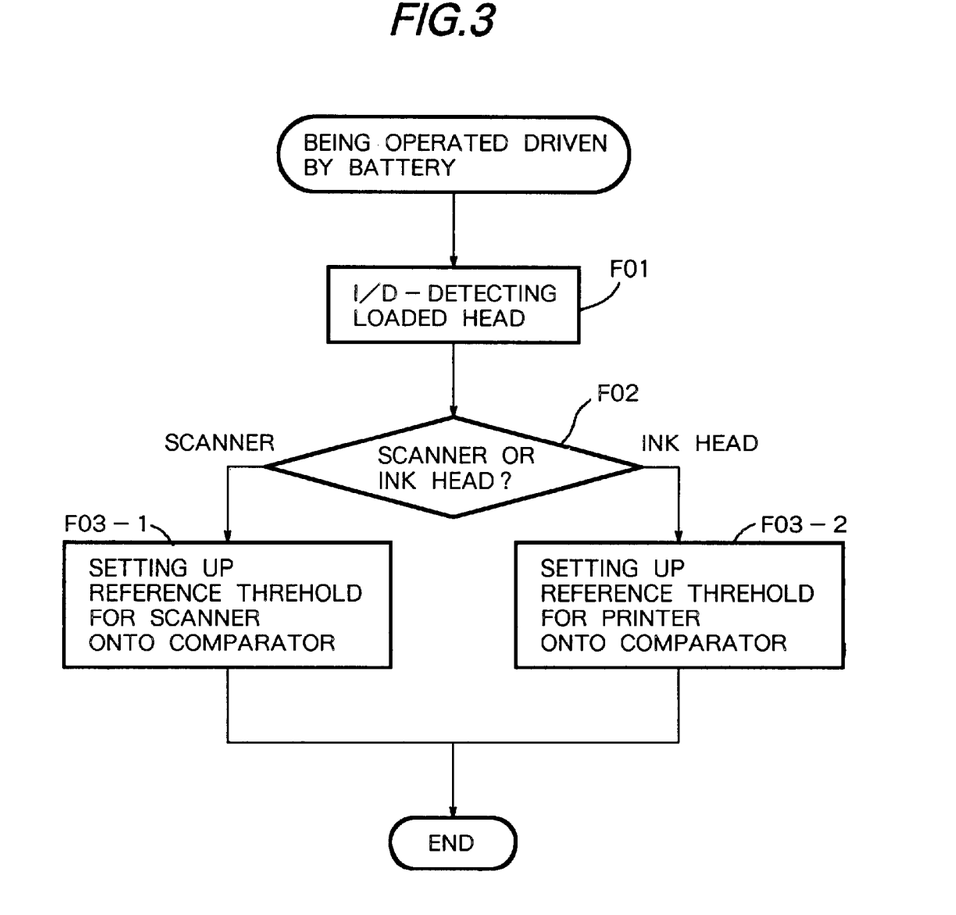
FIG. 3 is a flow chart showing a sequence of control operation performed in the embodiment.

Next, a control operation of the embodiments is to be described. FIG. 3 is a flow chart showing a control operation sequence of the embodiments.

Figure 4:
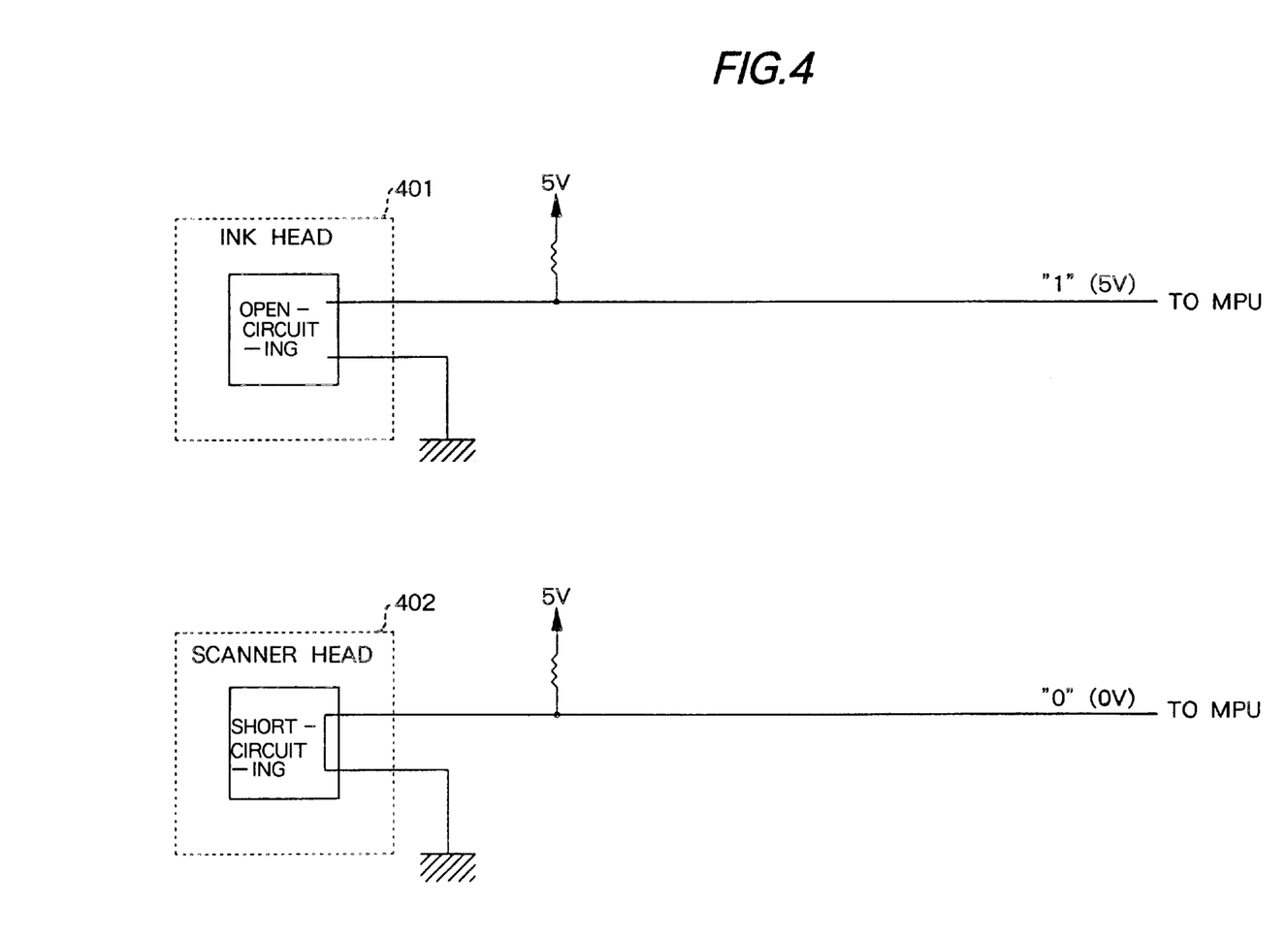
FIG. 4 is a circuit diagram showing a detecting mechanism of species of a head loaded on a carriage.

If the apparatus concerned is operated being driven by a battery, MPU 1 shown in FIG. 1 discriminates first the species of head loaded on the carriage 7 at Step F01 of FIG. 3. As a detecting procedure of the loaded head herein, a detecting mean utilizing an identification (referred to as "I/D" hereinafter) technology as shown in FIG. 4 is well known. The I/D technology is substantially formed of a discrimination whether certain terminals of various heads are connected with the ground (referred to as "GND" hereinafter) or ungrounded. For the case shown in FIG. 4, the ink head 401 is ungrounded while the scanner head 402 is connected to GND. MPU 1 reads the I/D data of the head concerned as a change of a signal propagated along a certain bus line 6. The signal output of I/D data exhibits a unity (referred to as "1" hereinafter) state having an output voltage of 5 volts (referred to as "V" hereinafter) if the ink head 401 is loaded on the carriage 7 while the signal output of I/D data is changed to a null (referred to as "0" hereinafter) state having an output voltage of 0 V if the scanner head is loaded. The species of the loaded head is discriminated by this signal change.

If the apparatus has a third function beside two incidentally, a tri-state I/D technology to detect whether a signal output from a certain terminal is plus, zero or minus, is available instead of this bistate I/D technology.

When species of head I/D-detected by above-mentioned procedure at Step F01 of FIG. 3 is the scanner head 402, MPU 1 passes a judgment at Step F02 that the apparatus is just now operating the scanner function, and then prepares a threshold value of the low battery level for scanner use as a comparing value of a comparator mean 203 at Step F03-1.

On the contrary, when the species of the loaded head is the ink head 401, MPU 1 passes another judgment at Step F02 that the apparatus concerned is now operating the printer function, and then chooses the threshold value of the low battery level for printer use at Step F03-2.

By above-mentioned setting up, the threshold level, by which the low battery state is to be detected, varies depending on the species of function modes just operated by the multifunctional apparatus concerned. Namely, during operating the printing function, the apparatus concerned detects the level of the low battery state whereby the reserved capacity can protect the ink head 401 while, during operating the scanner function, the apparatus can control the battery so as to utilize the battery capacity to its discharging limit.

Even when the species of loaded heads constituting the apparatus are changed during operation of the apparatus; for instance, when the ink head 401 is replaced with the scanner head 402, the control mode for detecting the low battery state should also be changed dependently upon the species of heads.

As mentioned above, the embodiments according to the present invention clarify that a difference in control methods of detecting the low battery level between the printing operation and the scanner operation can substantially solve the mismatch problem which we have so far encountered with so long as a constant threshold level is set up.

The embodiments mentioned above mainly deal with the apparatus wherein the inkjet head 401 and the scanner head 402 are exchangeably loaded. However, availability of the present invention is not limited to above-mentioned examples. The present invention is also available to an apparatus exchangeably loading a plurality of function units of which power dissipations are different from each other and of which lowest power capacity levels necessary for stably operating the functions are different from each other. For instance, this invention can still be carried out into practice even on an apparatus which exchangeably loads both a thermal head to transcribe an ink by the use of thermal energy and a scanner head.

Furthermore, although the example shown in FIG. 4 is employed as an I/D detection technology to discriminate the inkjet head 401 from the scanner head 402 in above-mentioned embodiments, I/D detection technologies according to the present invention are not restricted to the example mentioned above. It may be an I/D detection technology of the exchangeably loaded units wherein a code for identification recorded on a recording medium such as a ROM provided on each of units is identified by reading. It may also be an I/D detection technology of the exchangeably loaded units wherein a resistivity of a resistor provided on each of units so as to be resistively different from each other is identified by measurement. It may still be an I/D detection technology of the exchangeably loaded units wherein a switch installed on the apparatus is mechanically switching to different positions utilizing a pressing force of a bump and the like, which is provided on each of the units so as to have individually specific shapes different from each other.

The present invention is further applicable to other multifunctional apparatus driven by the battery in use for such as office automation beside the mentioned above; for instance, to a notebook-type personal computer, which is equipped with a key-in function, a printing function, recording functions utilizing an HDD, an FDD, a minicompact disk or an MO driver driven by different sorts of motors, a communicating function and with many other functions, and to many other apparatus. Herein the set up of the low battery level is controlled so that the minimum required power, which is necessary at least for stably operating the functions, is reserved in the battery.

What is claimed is:

1. An apparatus which is driven by a battery comprising:
   detecting means of a low level state of an energy quantity stored in said battery; and
   a plurality of operating functions in which said apparatus is operable, said plurality of operating functions including at least a printing function and a scanning function, each of said plurality of operating functions being different from each other;
   wherein said detecting means includes plural control method and a first one of said plural control methods differs from a second one of said plural control methods, depending on which of said operating functions is being operated.

2. An apparatus according to claim 1, wherein said apparatus is used for office automation.

3. An apparatus according to claim 1, wherein said low level state is detected by monitoring a terminal voltage of said battery.

4. An apparatus according to claim 1, wherein said scanning function is a function to scan an original image.

5. An apparatus according to claim 4, wherein said control method comprises a comparison of battery voltage against a threshold value, and wherein a threshold value during operating said scanning function is lower than a threshold value during operating said printing function.

6. An apparatus according to claim 4, further comprising a carriage for loading different species of heads, wherein said control methods of said detecting means are switched from one method to another method by detecting the species of the head loaded.

7. An apparatus according to claim 6, wherein said detection of said head species is performed by substantially discriminating a circuit status of said head between an open-circuited status and a short-circuited status.

8. A battery-operating apparatus which operates being driven by an electric power supplied from a battery, comprising:
   mounting means for exchangeably mounting at least one of a plurality of units having functions different from each other, each of said functions having a corresponding lowest level of capacity stored in said battery necessary for stable operation thereof, and each of said lowest levels being different from each other,
   detecting means for detecting a low level status of capacity stored in said battery, and
   control means for terminating an operation of said apparatus corresponding to said low level state of said battery detected by said detecting means, wherein said control means changes threshold values of said low level state of said battery thereby to terminate said operation of said apparatus in dependence upon species of said unit mounted on said mounting means.

9. A battery-operating apparatus according to claim 8, further comprising an I/D-means to identify said species of said unit mounted on said mounting means, wherein said control means changes said threshold values of said low level state of said battery thereby to terminate said operation of said apparatus in dependence on the species identified by said I/D-means.

10. A battery-operating apparatus according to claim 8, wherein said detecting mean detects said low level state of said battery depending on a terminal voltage of said battery.

11. A battery-operating apparatus according to claim 8, wherein said apparatus is a printer capable of printing operation onto recording media and said units include both a printing head to record data onto recording media and a scanner head capable of scanning original images.

12. A battery-operating apparatus according to claim 11, wherein said printing head is an inkjet-type printing head to record data onto recording media surfaces by ejecting ink.

13. A battery-operating apparatus according to claim 12, wherein said control mean terminates said operation of said apparatus at a lower level of said capacity stored in said battery when said unit loaded on said loading stage is said scanner head, compared with a level of said capacity stored in said battery when said unit loaded on said loading stage is said printing head.

14. A control method of a battery-operating apparatus, which operates being driven by an electric power supplied from a battery and comprises mounting means for exchangeably mounting at least one of a plurality of units having functions different from each other wherein each of said functions has a corresponding lowest level of capacity of said battery necessary for stable operation thereof and wherein each of aid lowest levels are different from each other, said control method comprising:
   an I/D process step for identifying said species of said unit mounted on said mounting means,
   a detecting step for detecting said low level status of capacity stored in said battery, and
   a terminating step for terminating said operation of said apparatus depending on said low level status of capacity stored in said battery detected by said detecting step, wherein said terminating step changes said threshold values of said low level state of said battery thereby to terminate said operation of said apparatus in dependence on said species of said unit mounted on said mounting means.

* * * * *

UNITED STATES PATENT AND TRADEMARK OFFICE
CERTIFICATE OF CORRECTION

PATENT NO. : 6,114,837
DATED : September 6, 2000
INVENTOR(S) : Hideki Nakanishi

It is certified that error appears in the above-identified patent and that said Letters Patent is hereby corrected as shown below:

Title page,
Under the heading "References Cited", insert the following:
-- 4,984,185      1/1991       Saito .................... 364/707
5,608,545       3/1997       Kagawa ................ 358/468
0 685 958       12/1995      European Pat. Off.
0 605 241       7/1994       European Pat. Off.
WO95/26607    10/1995      WIPO
6-268809        9/1994       Japan --

Abstract,
Line 9, delete "for".

Drawings,
Figure 3, change both occurrences of "THREHOLD" to -- THRESHOLD --.

Column 1,
Line 48, change "constituents" to -- the constituents --

Column 2,
Line 8, change "lowest" to -- lowered --; and
Line 28, change "mean" to -- means --.

Column 4,
Line 1, change "is" to -- are --.

Column 5,
Line 66, change "ating" to -- ation of --; and
Line 67, change "operating" to -- operation of --.

UNITED STATES PATENT AND TRADEMARK OFFICE
CERTIFICATE OF CORRECTION

PATENT NO.    : 6,114,837
DATED         : September 6, 2000
INVENTOR(S)   : Hideki Nakanishi It is certified that error appears in the above-identified patent and that said Letters Patent is hereby corrected as shown below:

<u>Column 6,</u>
Line 59, change "aid" to -- said --.

Signed and Sealed this

Sixteenth Day of October, 2001

*Attest:*

*Attesting Officer*

NICHOLAS P. GODICI
*Acting Director of the United States Patent and Trademark Office*